(12) United States Patent
Ganesan et al.

(10) Patent No.: US 8,537,399 B2
(45) Date of Patent: *Sep. 17, 2013

(54) SHARING CONTENT IN A CONTENT DATABASE AMONG PRINTERS VIA A REQUEST FROM A FIRST PRINTER

(75) Inventors: Kumaravel Ganesan, Chinnalapatti (IN); Palanikumar Thangapandian, Bangalore Karnataka (IN); Jojee Thomas Chackalackal, Bangalore Karnakata (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/162,964

(22) Filed: Jun. 17, 2011

(65) Prior Publication Data

US 2012/0320411 A1      Dec. 20, 2012

(51) Int. Cl.
*G06F 3/12*       (2006.01)
(52) U.S. Cl.
USPC ....................................... 358/1.15
(58) Field of Classification Search
USPC ....................................... 358/1.15
See application file for complete search history.

(56) References Cited

U.S. PATENT DOCUMENTS

| 7,586,636 | B2 | 9/2009 | Karaoguz et al. | |
| 7,623,256 | B2 | 11/2009 | Ciriza et al. | |
| 7,812,948 | B2 * | 10/2010 | Honda et al. | 356/326 |
| 2004/0064506 | A1 * | 4/2004 | Ohara | 709/204 |
| 2010/0123922 | A1 | 5/2010 | Condello et al. | |
| 2010/0188689 | A1 | 7/2010 | Gnanasambandam et al. | |
| 2010/0309508 | A1 | 12/2010 | Kamath et al. | |
| 2011/0063667 | A1 * | 3/2011 | Nishida | 358/1.15 |
| 2011/0090529 | A1 | 4/2011 | Hertling | |
| 2011/0315755 | A1 | 12/2011 | Koakutsu | |

OTHER PUBLICATIONS

Ragnet, Francois: "Social Networking for Printers?"; Nov. 8, 2007.
PTO—Non-Final Office Action dated Feb. 2, 2012 issued in related case U.S. Appl. No. 13/222,336; 8 pages.

* cited by examiner

*Primary Examiner* — Eric A Rust
(74) *Attorney, Agent, or Firm* — Garry A. Perry

(57) ABSTRACT

In one embodiment, a registry of network-connected printers that are members of a social print group is maintained at a computer system. Content is obtained. A request is received from a first network-connected printer that is a member of the group, the request to provide the content to a second network-connected printer that is a member of the group. The content is provided to the second printer in response to the request.

20 Claims, 4 Drawing Sheets

SHARING CONTENT IN A CONTENT DATABASE AMONG PRINTERS VIA A REQUEST FROM A FIRST PRINTER

BACKGROUND

Certain internet-connected printers are capable of sending and receiving communications and printable content via the Internet without being connected to a desktop computer, laptop computer, or other host computing device. Such functionality can provide considerable flexibility and efficiencies for a user, as the user may have the ability to download and print content at familiar and unfamiliar printers without the complication of first establishing a connection with a host.

BRIEF DESCRIPTION OF THE DRAWINGS

The accompanying drawings illustrate various embodiments and are a part of the specification. The illustrated embodiments are examples and do not limit the scope of the claims. Throughout the drawings, identical reference numbers designate similar, but not necessarily identical elements.

The same part numbers designate the same or similar parts throughout the figures.

DETAILED DESCRIPTION OF EMBODIMENTS

Figure 1:
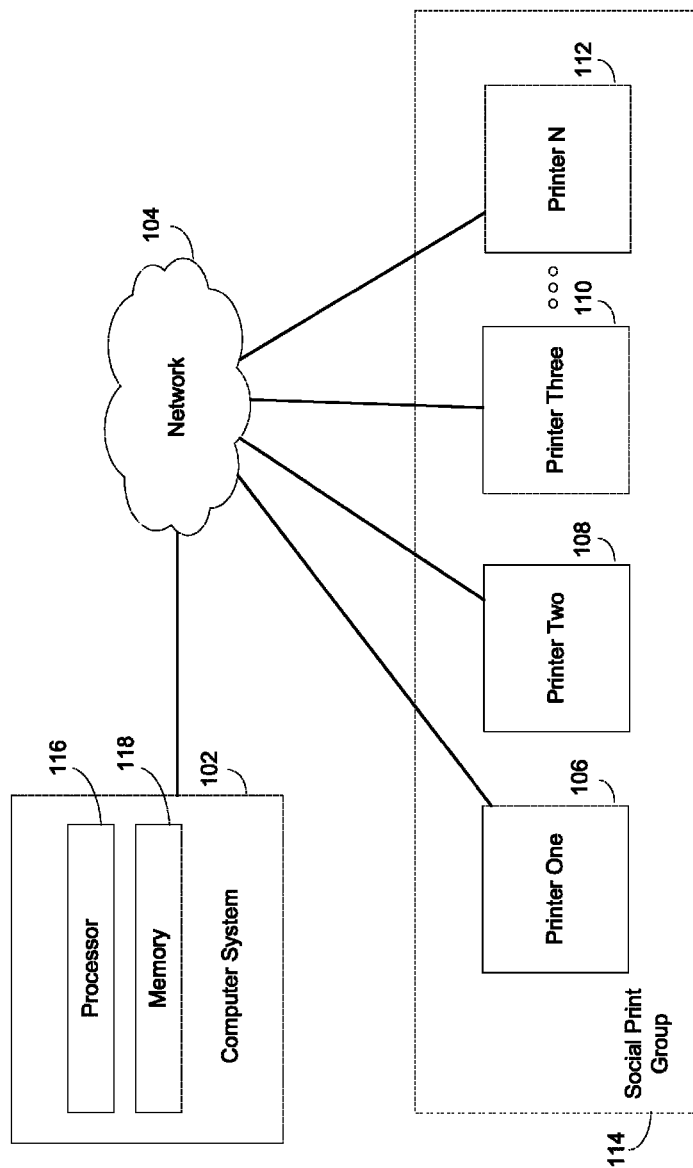
FIG. 1 is a block diagram illustrating a system according to various embodiments.

An advantage of an internet-connected printer is that content can be retrieved and printed at the printer without the printer being connected to a host computing device. A limitation to this advantage has been the ability for a user of such a printer to share content among a group such of such printers. For example, sharing between internet-connected printers is sometimes accomplished by a user at a first printer sending an email to a second printer or a set of printers with the content as an attachment. However, using email for sharing of content can be unwieldy in some use cases due to the length of the email addresses (e.g., when the addresses are supplied by a user), frequency of changes to email addresses (e.g., user changes or changes coinciding with a changed IP address), and/or the number of printers to with which content will be shared or published. These complicating factors are compounded when content is shared via multiple share lists. Other file sharing protocols that necessitate repeatedly providing an IP address or other printer identifier to share content between printers have similar limitations.

Accordingly, various embodiments described herein were developed in an effort to simplify and facilitate the sharing of content between network-connected printers by connecting the printers via a social print group. It should be noted that while the disclosure is discussed frequently with reference to internet-connected printers, the teachings of the present disclosure are not so limited and can be applied to any network-connected printer. According to embodiments described herein, a registry of network-connected printers that are members of a social print group is kept at a computer system. In an embodiment, the computer system obtains content that is shareable among printers that are members of the social print group. The content may be obtained from, or at the direction of, a first printer that is a member of the group. In an embodiment, the server system may obtain the content independently. The computer system receives from the first printer a request to provide the content to one or more of the other printers that are members of the social print group. In response to the request, the computer system provides the content to the other printer or printers in accordance with the first printer's request. In this manner, sharing of content between internet-connected and other network-connected printers is efficiently enabled without the need for users of the printers to compose emails or prepare distribution lists for each sharing event.

As used herein, a "network-connected printer" refers to a printer that can be connected to a network, to be capable of obtaining content, sending and receiving messages, accessing Internet content, and/or accessing internet applications via the network. In examples, a network may be a proprietary network, a secured network, an open network, an intranet, an extranet, an Internet or the Internet. A "social print group" refers to a group, community or collection of printers connected via a network. The printers may be grouped by virtue of an interdependency or commonality between the printers, including but not limited to receipt of an invitation to join the group, or friendship, kinship, location, common interests, financial exchanges, and/or educational exchanges as between users of the printers. "Sharing" content refers to providing, providing access to, or distributing content, "Content" refers to any text, image, or other content that can be displayed and/or printed. "Printer-captured content" refers to content that is in digital form by virtue of a scanning or image capture operation performed at a printer. "Printer" or "printing device" refers to any electronic device that prints and includes multifunctional electronic devices that perform additional functions such as scanning and/or copying.

FIG. 1 is a block diagram illustrating a system according to various embodiments. FIG. 1 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

FIG. 1 shows printer one 106, printer two 108, printer three 110, printer N 112, and computer system 102 connected to a network 104. Printers one 106, two 108, three 110, and N 112 represent generally computing devices that are operable to produce printed output and to send and receive communications and content to each other over the network 104. Computer system 102 represents generally any computing device or group of computing devices capable of sending networks requests and content to, and otherwise communicating with, printers one 106, two 108, three 110, and N 112. In embodiments, computer system 102 may be or include a server, desktop computer, laptop computer, mobile computing device, tablet computer, and/or any other computing device.

In an embodiment, computer system 102 creates a social print group 114 and maintains a registry of network-connected printers one 106, two 108, three 110, and N 112 that are members of the group. In embodiments, the registry may be in the form of a schedule, file, catalog, database, record, inventory, listing, directory or list. Computer system 102 may send invitations to network-connected printers to be members of the social print group 114. In an example, the invitations may be sent to the prospective member printers based on data suggesting one or more types of interdependency or commonality between users of the member printers and users of the prospective printers, such as, but not limited to, friendship, kinship, location, common interests, financial exchanges, and educational exchanges.

Computer system 102 obtains content that shareable among network-connected printers one 106, two 108, three 110, N 112 and other network-connected printers that are members of the social print group 114. In examples, the computer system 102 may obtain the content at the direction of one of the network-connected printers, or may obtain the content by other means. For example, the content may be printer-captured content that is received at server 102 via the network 104 from any of printers one 106, two 108, three 110, or N 112. In another example, the content received at computer system 102 may be content received from a remote repository, e.g., a web page hosted by a web server computing device accessible to computer system 102 via the network. The content may be obtained via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP"), and/or Session Initiation Protocol ("SIP").

Computer system 102 receives from network-connected printer one 106, via network 104, a request to provide the content to a network-connected printer two 108. Printer one 106 and printer two 108 are members of the same social print group 114. In an example, the request may originate from a web browser at printer one 106. In another example, the request that is received at computer system 102 may be received via a software application that is executed at printer one 106, or at another computing device in communication with printer one 106. In yet another example, the request that is received at computer system 102 may be received via a web application that is accessible to a user at printer one 106, but which actually is executed at a web server that is remote to printer one 106 and accessible to printer one 106 via the network 104.

In response to receipt of the request to provide content, computer system 102 provides the content to printer two 108. The content may be provided via a networking protocol, including but not limited to Transmission Control Protocol/Internet Protocol ("TCP/IP"), HyperText Transfer Protocol ("HTTP"), Simple Mail Transfer Protocol ("SMTP"), Extensible Messaging and Presence Protocol ("XMPP") and/or Session Initiation Protocol ("SIP"). In an example, system 102 may send the content directly to printer two 108 via the network 104. In another example, computer system 102 may post the content at a web site that is accessible to printer two 108 via the network 104 such that printer two 108 can obtain the content from the web site.

The functions and operations described with respect to computer system 102 may be implemented as a computer-readable storage medium containing instructions executed by a processor (e.g., processor 116) and stored in a memory (e.g., memory 118). In a given implementation, processor 116 may represent multiple processors, and memory 118 may represent multiple memories. Processor 116 represents generally any instruction execution system, such as a computer/processor based system or an ASIC (Application Specific Integrated Circuit), a computer, or other system that can fetch or obtain instructions or logic stored in memory 118 and execute the instructions or logic contained therein. Memory 118 represents generally any memory configured to store program instructions and other data.

Figure 2:
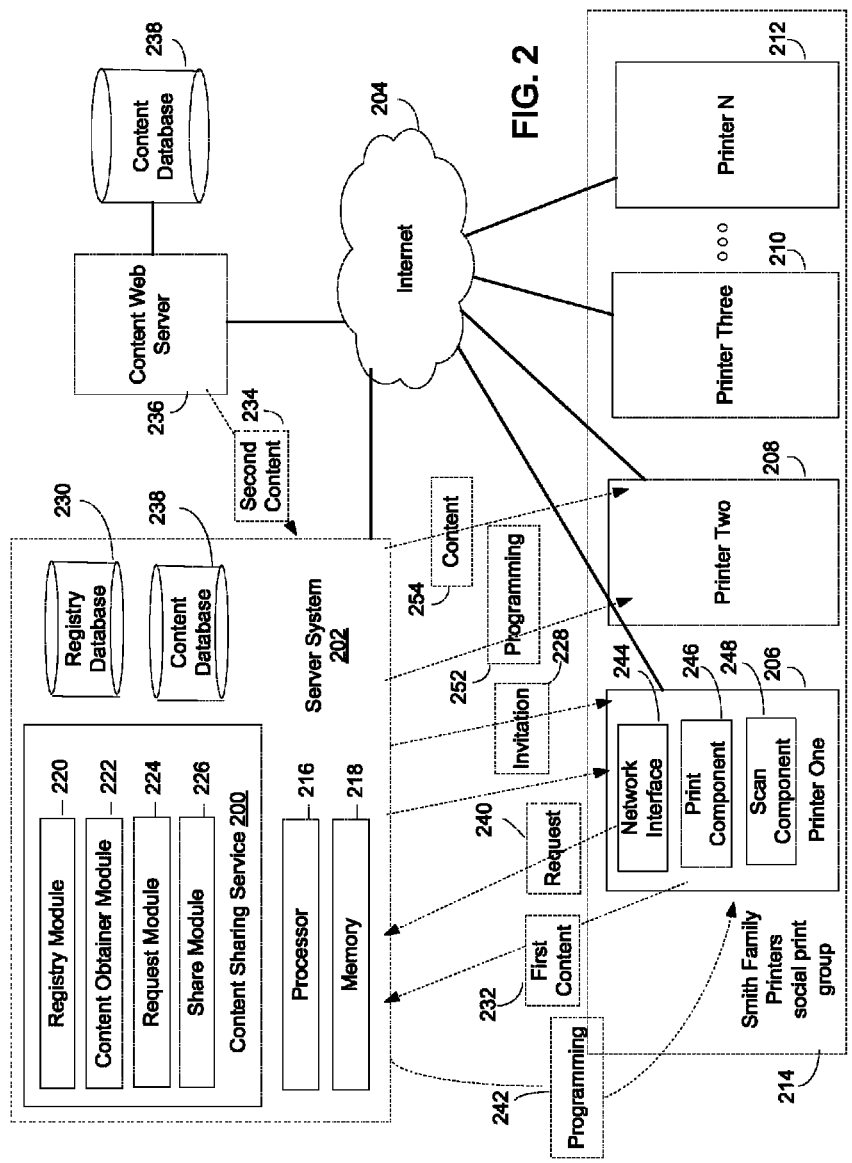
FIG. 2 is a block diagram illustrating a system according to various embodiments.

FIG. 2 is a block diagram that includes a server system according to various embodiments. FIG. 2 includes particular components, modules, etc. according to various embodiments. However, in different embodiments, more, fewer, and/or other components, modules, arrangements of components/modules, etc. may be used according to the teachings described herein. In addition, various components, modules, etc. described herein may be implemented as one or more software modules, hardware modules, special-purpose hardware (e.g., application specific hardware, application specific integrated circuits (ASICs), embedded controllers, hardwired circuitry, etc.), or some combination of these.

As illustrated in FIG. 2, server system 202 may be a single physical device or it may be distributed among multiple physical devices connected over a network (e.g., the Internet). For example, server system 202 may represent a cloud computing infrastructure (i.e., the cloud). In a cloud computing infrastructure, various components/modules of server system 202 may share resources and/or act in concert even though they might be in different physical locations and/or operating on different physical devices.

FIG. 2 shows printer one 206, printer two 208, printer three 210, printer N 212, and server system 202 connected to internet 204. Server system 202 includes a content sharing service 200 that includes a registry module 220, content obtainer module 222, request module 224, and share module 226.

Registry module 220 maintains a registry database 230 of internet-connected printers, including printers one 206, two 208, three 210, and N 212 that are members of a "Smith Family Printers" social group 214. In this example, the Smith Family Printers social group 214 is a collection of printers whose member printers are owned or used by members of a Smith family. Server system 212 may send an invitation 228 to an internet-connected printer to be a member of the Smith Family Printers social print group 214 based kinship, friendship, location and other dependencies between users of the printers. In an example, registry module 220 may receive a request to add an internet-connected printers to the Smith Family Printers social print group 214, and in response such a request designate a printer as a member of the group at the registry database 230. In an embodiment, registry module 220 may send to printer one 206 programming 242 to provide access for printer one 206 to the registry database 230. In yet another example, registry module 220 may send to printer one 206 programming 242 to enable printer one 206 to view a listing or graphic of members of the social print network 214, and to send a request to server system 202 to provide content to the other printers.

Content obtainer module 222 obtains content that can be provided to internet-connected printers one 206, two 208, three 210, N 212 and other internet-connected printers that are members of the social print group 214. In an example, the server system 202 may obtain first content 232, via the internet 204, from printer one 206 as printer-captured content (e.g., digital content that was created by scanning or image capture at printer one 206. In another example, the obtained content may be printer-captured content that is received at server system server 202 via the internet 204 from any of printers two 208, three 210, or N 212. In another example, server system 202 may receive second content 234 via the internet 204 from web server 236, at the direction of printer one 206. An example of a web server that server system 202 might receive second content 234 from is an internet-accessible photo service such as the Snapfish® web service provided by Hewlett Packard Company of Palo Alto, Calif. Content obtainer module 222 causes the first 232 and second 234 content to be stored within server system 202 at content database 238.

Request module 224 receives from internet-connected printer one 206, via internet 204, a request 240 to provide content to an internet-connected printer two 208. Printer one 206 and printer two 208 are members of the same social print group 214. In an example, the request 240 is sent to server system 202 by printer one 206 via an internet application accessed at printer one 206. In another example, the request 240 is received from printer one 206 via a software application that is executed at printer one.

Share module 226, in response to the request module's receipt of the request 240 to provide content, provides, via the internet 204, content 254 to printer two 208 by sending to printer two 208 programming 252 configured to enable printer two 208 to access the content. In examples, content 254 may be first content 232, second content 234, or a combination of both first content 232 and second content 234. In an embodiment, the programming 252 that is sent to printer two 208 is a user interface to provide a user of printer two 208 with a view of and access to the first and second content at server system 202.

In another example, the programming 252 that is sent to printer two 208 is a user interface to allow a user of printer two 208 to view and access the first 232 and second 234 content via a web service application that executes at a computing device separate from server system 202. Returning to the Snapfish® web service as an example of a web service 236, a user interface may be sent to printer two 208 that is a graphic user interface icon to appear on a control panel of printer two 208. When touched by a user of printer two 208, the icon provides the user with an ability to view and access, via server system 202, photo content stored at the Snapfish® web server that was posted by printer one 206 for access by other internet-connected printers that are members of the Smith Family Printers social print group. 214.

In an example, the programming 252 that is sent to printer two 208 is a software application configured to be executed at printer two 208 and thus enable the accessing of the content by printer two 208. In another example, the programming 252 that is sent by share module 226 to printer two 208 is a Uniform Resource Locator ("URL") or other address that specifies where the content is available and/or a mechanism for retrieving the content. In another example, server system 202 may provide content 254 to printer two 208 by posting the content at a web site accessible to the printer two 208. In yet another example, server system 202 may send the content 254 itself to printer two 208 via the internet 204.

Printer one 206 is shown to include a network interface 244, print component 246, a scan component 248. Network interface 244 any combination of hardware and programming configured for electronically connecting printer one 206 to internet 204. Print component 246 represents generally any combination of hardware and programming configured to produce printed output. Scan component 248 represents generally any combination of hardware and programming configured to perform a scanning or image capture operation at printer one 206 so as to create printer-captured content in a digital form that can be shared with the other printers in the social print group 214 via the content sharing service 200 of server system 202. Printers two 208, three 210, and N 212 may be configured similarly to printer one 206.

The functions and operations described with respect to server system 202 may be implemented as a computer-readable storage medium containing instructions executed by a processor (e.g., processor 216) and stored in a memory (e.g., memory 218).

Figure 3:
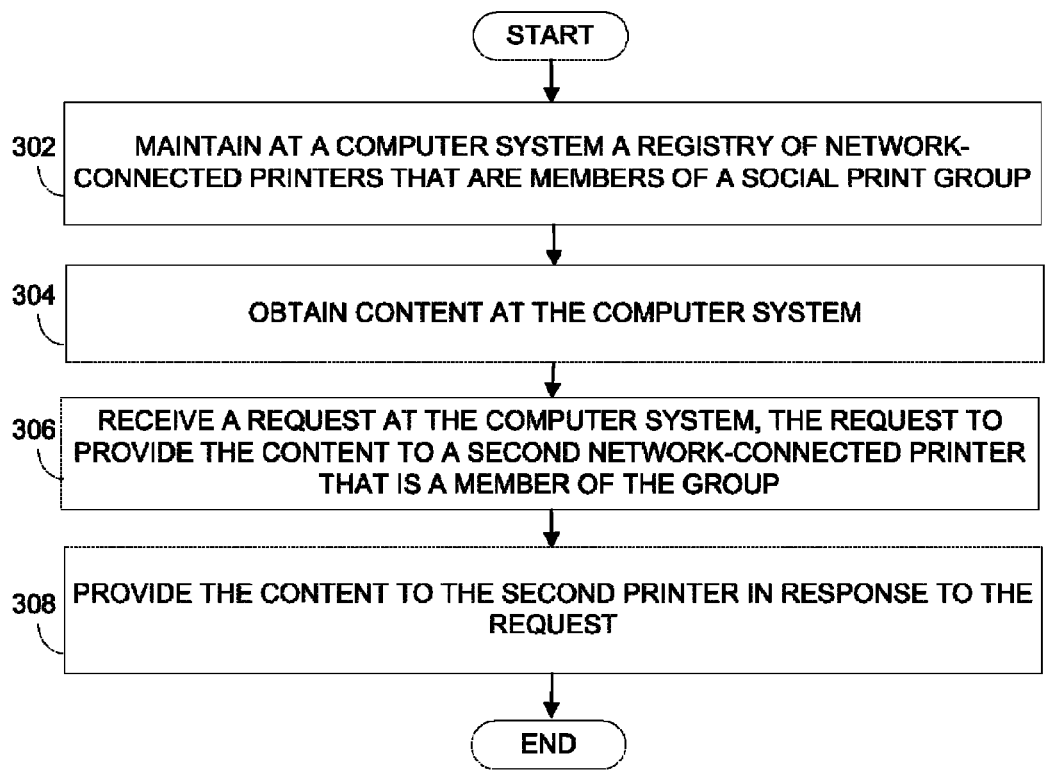
FIG. 3 is a flow diagram depicting steps taken to implement various embodiments.
Figure 4:
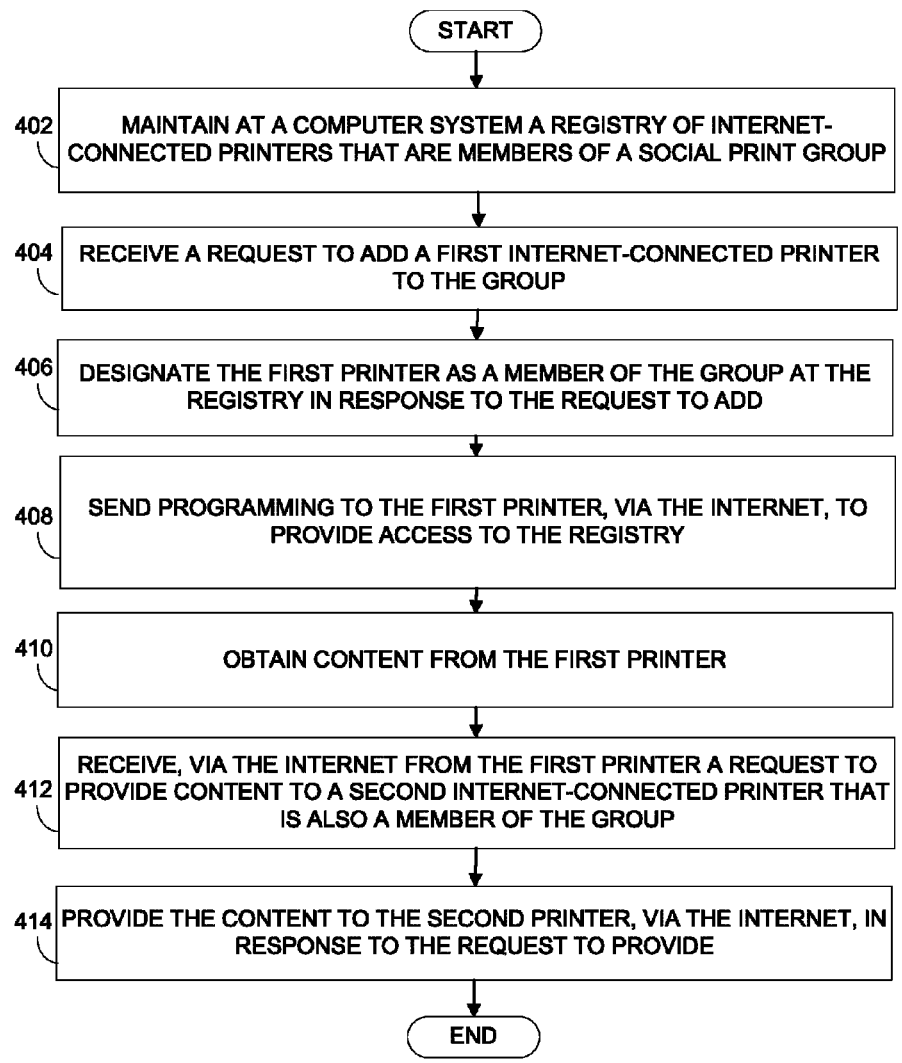
FIG. 4 is a flow diagram depicting steps taken to implement various embodiments.

FIGS. 3 and 4 are flow diagrams of operation in a system according to various embodiments. In discussing FIGS. 3 and 4, reference may be made to the diagrams of FIGS. 1 and 2 to provide contextual examples. Implementation, however, is not limited to those examples. Starting with FIG. 3, a registry of network-connected printers that are members of a social print group is maintained at a computer system (block 302). Referring back to FIG. 2, the registry module 220 may be responsible for implementing block 302.

Continuing with the flow diagram of FIG. 3, content is obtained at the computer system (block 304). Referring back to FIG. 2, the content obtainer module 222 may be responsible for implementing block 304.

Continuing with the flow diagram of FIG. 3, a request is received from a first network-connected printer that is a member of the group. The request is a request to provide the content to a second network-connected printer that is a member of the group (block 306). Referring back to FIG. 2, the request module 224 may be responsible for implementing block 306.

Continuing with the flow diagram of FIG. 3, the content is provided to the second printer in response to the request (block 308). Referring back to FIG. 2, the share module 226 may be responsible for implementing block 308.

Moving to FIG. 4, a registry of internet-connected printers that are members of a social print group is maintained at a computer system (block 402). Referring back to FIG. 2, the registry module 220 may be responsible for implementing block 402.

Continuing with the flow diagram of FIG. 4, a request to add a first internet-connected printer to the group is received at the computer system (block 404). Referring back to FIG. 2, the registry module 220 may be responsible for implementing block 404.

Continuing with the flow diagram of FIG. 4, the first printer is designated as a member of the group at the registry in response to the request to add (block 406). Referring back to FIG. 2, the registry module 220 may be responsible for implementing block 406.

Continuing with the flow diagram of FIG. 4, programming is sent to the first printer, via the internet, to provide the first printer with access to the registry (block 408). Referring back to FIG. 2, the registry module 220 may be responsible for implementing block 408.

Continuing with the flow diagram of FIG. 4, content is obtained from the first printer (block 410). Referring back to FIG. 2, the content obtainer module 222 may be responsible for implementing block 410.

Continuing with the flow diagram of FIG. 4, a request is received, via the internet, from the first printer. The request is a request to provide content to a second internet-connected printer that is a member of the group (block 412). Referring back to FIG. 2, the request module 224 may be responsible for implementing block 412.

Continuing with the flow diagram of FIG. 4, the content is provided to the second printer, via the internet, in response to the request to provide (block 414). Referring back to FIG. 2, the share module 226 may be responsible for implementing block 414.

Although the flow diagrams of FIGS. 3 and 4 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present disclosure.

Various modifications may be made to the disclosed embodiments and implementations without departing from their scope. Therefore, the illustrations an examples herein should be construed in an illustrative, and not a restrictive, sense.

What is claimed is:

1. A method to share content among printers, comprising:
maintaining, at a computer system outside of a social print group, a registry of network-connected printers that are members of the social print group;
obtaining content by the computer system and storing the obtained content in a content database at the computer system;
receiving, from a first network-connected printer a request to provide the content from the content database to a second network-connected printer, the first and second printers being members of the social print group;
providing the content from the content database to the second printer in response to the request.

2. The method of claim 1, wherein the content is obtained from the first printer by the computer system.

3. The method of claim 2, wherein the content is printer-captured content obtained from the first printer by the computer system.

4. The method of claim 1, wherein the content is obtained at the direction of the first printer.

5. The method of claim 1, wherein the request is received via an internet application accessible at the first printer.

6. The method of claim 1, wherein the request is received via an application executed at the first printer.

7. The method of claim 1, wherein providing the content comprises sending to the second printer programming configured to enable the second printer to access the content.

8. The method of claim 7, wherein the programming comprises a user interface to provide a user of the second printer with access to the content.

9. The method of claim 8, wherein the interface is configured to provide to a user a view of the content at the computer system.

10. The method of claim 7, wherein the programming comprises a website address for the content.

11. The method of claim 7, wherein the programming comprises an application configured to be executed at the second printer, the application to provide the second printer with access to the content.

12. The method of claim 1, further comprising creating the group.

13. The method of claim 1, further comprising sending a membership invitation to a network-connected printer that is not a member of the group.

14. A system to share content among printers, comprising:
a registry module, configured to maintain, at a computer system, a registry of network-connected printers that are members of a social print group;
a content obtainer module in the computer system outside of the social print group, configured to obtain content and store the obtained content in a content database at the computer system;
a request module, configured to receive from a first network-connected printer a first request to provide the content to a second network-connected printer, the first and second printers being members of the social print group;
a share module, configured to provide the content to the second printer in response to the first request.

15. The system of claim 14, wherein the content is printer-captured content and is obtained by the computer system from the first printer or at the direction of the first printer.

16. The system of claim 14, wherein providing the content comprises sending to the second printer first progamming configured to provide the second printer with access to the content in the content database and to provide a user of the second printer with a view of the content.

17. The system of claim 14, wherein providing the content comprises sending the content from the content database to the second printer.

18. The system of claim 14, wherein providing the content comprises the computer system posting the content from the first network-connected printer at a web site accessible to the second printer.

19. The system of claim 14, wherein the registry module is further configured to
receive, at the computer system, a second request to add the first network-connected printer to the group;
designate at the computer system, the first printer as a member of the group at the registry in response to the second request;
send from the computer system to the first printer second programming to enable the first printer to provide access to the registry.

20. A non-transitory computer-readable storage medium containing instructions for sharing content among internet-connected printers, the instructions when executed by a processor causing the processor to:
maintain, at a computer system, a registry of internet-connected printers that are members of a social print group;
receive, at the computer system, a first request to add a first internet-connected printer to the social print group;
designate the first printer as a member of the social print group at the registry in response to the request;
send to the first printer, via an internet, programming to provide the first printer with access to the registry:
obtain content from the first printer by the computer system and store the obtained content in a content database outside of the social print group;
receive, via the internet from the first printer, a second request to provide the content to a second network-connected printer that is a member of the social print group:
provide the content to the second printer, via the internet, in response to the second request.

* * * * *

UNITED STATES PATENT AND TRADEMARK OFFICE
CERTIFICATE OF CORRECTION

PATENT NO.         : 8,537,399 B2                                    Page 1 of 1
APPLICATION NO.    : 13/162964
DATED              : September 17, 2013
INVENTOR(S)        : Kumaravel Ganesan et al.

It is certified that error appears in the above-identified patent and that said Letters Patent is hereby corrected as shown below:

In the Claims:

In column 8, line 15, in Claim 16, delete "progamming" and insert -- programming --, therefor.

In column 8, line 45, in Claim 20, before "request;" insert -- first --.

In column 8, line 47, in Claim 20, delete "registry:" and insert -- registry; --, therefor.

In column 8, line 54, in Claim 20, delete "group:" and insert -- group; --. therefor.

Signed and Sealed this
Eighteenth Day of February, 2014

Michelle K. Lee
*Deputy Director of the United States Patent and Trademark Office*